(12) United States Patent
Cho

(10) Patent No.: US 7,889,256 B2
(45) Date of Patent: Feb. 15, 2011

(54) METHOD AND APPARATUS FOR REDUCING TEMPORAL ROW-WISE NOISE IN IMAGERS

(75) Inventor: Taehee Cho, Irvine, CA (US)

(73) Assignee: Aptina Imaging Corporation, George Town (KY)

( * ) Notice: Subject to any disclaimer, the term of this patent is extended or adjusted under 35 U.S.C. 154(b) by 485 days.

(21) Appl. No.: 12/155,917

(22) Filed: Jun. 11, 2008

(65) Prior Publication Data

US 2009/0309033 A1 Dec. 17, 2009

(51) Int. Cl.
H04N 3/14 (2006.01)
H04N 5/217 (2006.01)
H04N 9/64 (2006.01)

(52) U.S. Cl. .................. 348/308; 348/241; 348/243; 348/248

(58) Field of Classification Search ............. 348/308, 348/241–248; 341/161–163
See application file for complete search history.

(56) References Cited

U.S. PATENT DOCUMENTS

| | | | |
|---|---|---|---|
| 5,698,844 A * | 12/1997 | Shinohara et al. | ....... 250/214 R |
| 7,092,017 B2 | 8/2006 | Kelly et al. | |
| 7,148,833 B1 * | 12/2006 | Cho et al. | ................ 341/162 |
| 2003/0128147 A1 | 7/2003 | Huang et al. | |
| 2003/0193597 A1 | 10/2003 | Fossum et al. | |
| 2004/0113052 A1 | 6/2004 | Johanneson et al. | |
| 2005/0001919 A1* | 1/2005 | Rossi | ...................... 348/308 |
| 2005/0046715 A1 | 3/2005 | Lim et al. | |
| 2005/0200730 A1 | 9/2005 | Beck et al. | |
| 2005/0206752 A1* | 9/2005 | Lim | ........................ 348/241 |
| 2005/0243193 A1 | 11/2005 | Gove et al. | |
| 2006/0012696 A1 | 1/2006 | Zarnowski et al. | |
| 2006/0044172 A1* | 3/2006 | Sasaki et al. | ............... 341/161 |
| 2006/0044437 A1 | 3/2006 | Shah | |
| 2006/0187329 A1* | 8/2006 | Panicacci | .................. 348/308 |
| 2006/0192864 A1 | 8/2006 | Mauritzson | |
| 2007/0019085 A1* | 1/2007 | Suzuki | ...................... 348/241 |
| 2007/0041062 A1 | 2/2007 | Chinnaveerappan et al. | |
| 2007/0235631 A1 | 10/2007 | Ladd | |
| 2008/0012966 A1 | 1/2008 | Beck et al. | |
| 2008/0043128 A1 | 2/2008 | Poonnen et al. | |
| 2008/0054320 A1 | 3/2008 | Solhusvik et al. | |
| 2009/0180016 A1* | 7/2009 | Barna et al. | .................. 348/308 |

FOREIGN PATENT DOCUMENTS

| | | |
|---|---|---|
| CN | 101064788 A | 10/2007 |
| JP | 2003-163844 | 6/2003 |
| WO | WO-2008/005007 A1 | 1/2008 |
| WO | WO-2008/030327 A2 | 3/2008 |

OTHER PUBLICATIONS

Philipp, R.M. et al., "Linear Current-Mode Active Pixel Sensor", IEEE Journal of Solid-State Circuits, vol. 42, Issue 11, pp. 2482-2491, Nov. 2007.

(Continued)

*Primary Examiner*—Lin Ye
*Assistant Examiner*—Marly Camargo

(57) ABSTRACT

A method and apparatus for reducing temporal row noise by sampling pixel signals and a separate signal representing noise. The pixel signals and noise signals are used in a correlated differential sampling operation.

18 Claims, 17 Drawing Sheets

OTHER PUBLICATIONS

Pittet, Patrick et al., "Noise Modeling for Charge Amplification and Sampling", 13th IEEE International Conference on Electronics, Circuits and Systems, pp. 9-12, Dec. 10-13, 2006.

Degerli, Yavuz et al., "Analysis and reduction of Signal Readout Circuitry Temporal Noise in CMOS Image Sensors for Low-Light Levels", IEEE Transactions on Electron Devices, vol. 47, Issue 5, pp. 949-962, May 2000.

Kawai, Nobuhiro et al., "Noise Analysis of High-Gain, Low-Noise Column Readout Circuits for CMOS Image Sensors", IEEE Transactions on Electron Devices, vol. 51, Issue 2, pp. 185-194, Feb. 2004.

Faramarzpour, Naser et al., "An Approach to Improve the Signal-to-Noise Ratio of Active Pixel Sensor for Low-Light-Level Applications", IEEE Transactions on Electron Devices, vol. 53, Issue 9, pp. 2384-2391, Sep. 2006.

Lindgren, Leif, "Elimination of Quantization Effects in Measured Temporal Noise", Proceedings of the 2004 International Symposium on Circuits and Systems, vol. 4 pp. IV-932-5, May 23-26, 2004.

Kleinfelder, Stuart et al., "Novel Integrated CMOS Pixel Structures for Vertex Detectors", 2003 IEEE Nuclear Science Symposium Conference Record, vol. 1, pp. 335-339, Oct. 2003.

Blanksby, Andrew et al., "Noise Performance of a Color CMOS Photogate Image Sensor", International Electron Devices Meeting, Technical Digest, pp. 205-208, Dec. 7-10, 1997.

* cited by examiner

METHOD AND APPARATUS FOR REDUCING TEMPORAL ROW-WISE NOISE IN IMAGERS

BACKGROUND OF THE INVENTION

1. Field of the Invention

Embodiments described herein relate generally to improved semiconductor imaging devices and in particular to imaging devices having an array of pixels and to methods of operating the pixels to reduce temporal noise.

2. Background of the Invention

A conventional four transistor (4T) circuit for a pixel 150 of a CMOS imager is illustrated in FIG. 1. The 4T pixel 150 has a photosensor such as a photodiode 162, a reset transistor 184, a transfer transistor 190, a source follower transistor 186, and a row select transistor 188. It should be understood that FIG. 1 shows the circuitry for operation of a single pixel 150, and that in practical use, there will be an M×N array of pixels arranged in rows and columns with the pixels of the array being accessed using row and column select circuitry, as described in more detail below.

The photodiode 162 converts incident photons to electrons, which are selectively passed to a floating diffusion node A through transfer transistor 190 when the transistor 190 is activated by the TX1 control signal. The source follower transistor 186 has its gate connected to node A and thus amplifies the signal appearing at the floating diffusion node A. When a particular row containing pixel 150 is selected by an activated row select transistor 188, the signal amplified by the source follower transistor 186 is passed on a column line 170 to column readout circuitry (not shown). The photodiode 162 accumulates a photo-generated charge in a doped region of its substrate during a charge integration period. It should be understood that the pixel 150 may include a photogate or other photon to charge converting device, in lieu of a photodiode, as the initial accumulator for photo-generated charge.

The gate of transfer transistor 190 is coupled to a transfer control signal line 191 for receiving the TX1 control signal, thereby serving to control the coupling of the photodiode 162 to node A. A voltage source Vpix is selectively coupled through reset transistor 184 and conductive line 163 to node A. The gate of reset transistor 184 is coupled to a reset control line 183 for receiving the RST control signal to control the reset operation in which the voltage source Vpix is connected to node A.

A row select signal (Row Sel) on a row select control line 160 is used to activate the row select transistor 188. Although not shown, the row select control line 160, reset control line 183, and transfer signal control line 191 are coupled to all of the pixels of the same row of the array. Voltage source Vpix is coupled to transistors 184 and 186 by conductive line 195. The column line 170 is coupled to all of the pixels of the same column of the array and typically has a current sink 176 at its lower end. Maintaining a positive voltage on the column line 170 during an image acquisition phase keeps the potential in a known state on the column line 170. Signals from the pixel 150 are therefore selectively coupled to a column readout circuit 261 (FIGS. 2-4) through the column line 170.

As is known in the art, a value can be read from pixel 150 in a two step correlated double sampling process. First, node A is reset by activating the reset transistor 184. The reset signal (e.g., Vrst) found at node A is readout to column line 170 via the source follower transistor 186 and the activated row select transistor 188. During a charge integration period, photodiode 162 produces charge from incident light. This is also known as the image acquisition period. After the integration period, transfer transistor 190 is activated and the charge from the photodiode 162 is passed through the transfer transistor 190 to node A, where the charge is amplified by source follower transistor 186 and passed to column line 170 (through the row select transistor 188) as an integrated charge signal Vsig. As a result, two different voltage signals—the reset signal Vrst and the integrated charge signal Vsig—are readout from the pixel 150 and sent on the column line 170 to column readout circuitry, where each signal is sampled and held for further processing as is known in the art. Typically, all pixels in a row are readout simultaneously onto respective column lines 170 and the column lines may be activated in sequence or in parallel for pixel reset and signal voltage readout.

FIG. 2 shows an example CMOS imager device 201 that includes an array 230 of pixels and a controller 232, which provides timing and control signals to enable reading out of signals stored in the pixels in a manner commonly known to those skilled in the art. Example arrays have dimensions of M×N pixels, with the size of the array 230 depending on a particular application. The pixel signals from the array 230 are readout a row at a time using a column parallel readout architecture. The controller 232 selects a particular row of pixels in the array 230 by controlling the operation of row addressing circuit 234 and row drivers 240. Signals corresponding to charges stored in the selected row of pixels and reset signals are provided on the column lines 170 to a column readout circuit 242 in the manner described above. The pixel signal read from each of the columns can be readout sequentially using a column addressing circuit 244. Pixel signals (Vrst, Vsig) corresponding to the readout reset signal and integrated charge signal are provided as respective outputs Vrst, Vsig of the column readout circuit 242 where they are subtracted in differential amplifier 275, digitized by analog-to-digital converter (ADC) 248, and sent to an image processor circuit 250 for image processing.

FIG. 3 shows more details of the rows and columns 249 of active pixels 150 in array 230. Each column 249 includes multiple rows of pixels 150. Signals from the pixels 150 in a particular column 249 can be readout to sample and hold circuitry 261 associated with the column 249 (part of circuit 242) for acquiring the pixel reset Vrst and integrated charge Vsig signals. Signals stored in the sample and hold circuits 261 can be read sequentially column-by-column to the differential amplifier 246 (FIG. 2), which subtracts the reset and integrated charge signals and sends them to the analog-to-digital converter 248 (FIG. 2). A plurality of analog-to-digital converters 248 may also be provided, each digitizing sampled and held signals from one or more columns 249.

FIG. 4 illustrates a portion of the sample and hold circuit 261 of FIG. 3 in greater detail. The sample and hold circuit 261 holds a set of signals, e.g., a reset signal Vrst and an integrated charge signal Vsig from a desired pixel. For example, a reset signal Vrst of a desired pixel connected to column line 170 is stored on capacitor 226 and the integrated charge signal Vsig is stored on capacitor 228. A front side of capacitor 226 is switchably coupled to the column line 170 through switch 222 and a backside of capacitor 226 is switchably coupled to amplifier 275 through switch 218. A front side of capacitor 228 is switchably coupled to the column line 170 through switch 220 and a backside of capacitor 228 is switchably coupled to amplifier 275 through switch 216. The front side of capacitor 226 is switchably coupled to the front side of capacitor 228 through crowbar switch 239. The backside of capacitor 226 is switchably coupled to the backside of capacitor 228 and to a reference voltage Vref source through clamp switch 299.

Each sample and hold circuit 261 is coupled to amplifier 275 having a first and a second input. The first input of amplifier 275 is coupled to a first output of amplifier 275 through a capacitor 278 and a switch 279 to provide a first feedback circuit. The second input of amplifier 275 is coupled to a second output of amplifier 275 through a capacitor 276 and a switch 277 to provide a second feedback circuit.

The conventional CMOS imager of FIGS. 1-4 has identical correlated double sampling and holding timing for all columns over an entire row. Thus, all of the pixels in a row are readout at substantially the same time. The simplified correlated double sampling and column read out timing is depicted in FIG. 5.

Thus, to begin a readout operation, a logic high clamp signal is provided to clamp switch 299 thereby coupling the backsides of capacitors 226, 228 to a reference voltage source Vref. When a reset signal is read from a pixel 150, a logic high SHR signal is provided to the gate of switch 222 thereby coupling the front side of capacitor 226 to the column line 170. When the readout of the reset signal from the pixel 150 is complete, a logic low SHR signal is provided to the gate of switch 222 thereby uncoupling the front side of capacitor 226 from the column line 170. Thus, a reset signal Vrst has been sampled and stored on capacitor 226.

After the reset Vrst signal is read from pixel 150, an integrated charge signal Vsig is read. When an integrated charge signal Vsig is read from pixel 150, a logic high SHS signal is provided to the gate of switch 220 thereby coupling the front side of capacitor 228 to the column line 170. When the readout of the integrated charge signal Vsig from the pixel 150 is complete, a logic low SHS signal is provided to the gate of switch 220 thereby uncoupling the front side of capacitor 228 from the column line 170. Thus, an integrated charge signal Vsig has been sampled and stored on capacitor 226.

When a readout operation is complete, a logic low clamp signal is provided to clamp switch 299 thereby uncoupling the backsides of capacitors 226, 228 from the reference voltage source Vref.

After a row of pixels has been readout and sampled and held, then, generally in column order, the sample and hold circuits 261 output their stored signals to the amplifier 275. When reading from a first sample and hold circuit 261, a logic high control signal Φamp is provided to the feedback circuits to close switch 279 to couple the first output of amplifier 275 through capacitor 278 to its first input and to close switch 277 to couple the second output of amplifier 275 through capacitor 276 to its second input. A logic high crowbar control signal, e.g., crowbar1 for the sample and hold circuit 261 associated with the first column, is also provided to the sample and hold circuit 261 being readout to close the associated crowbar switch 239, thereby coupling the front side of capacitor 226 to the front side of capacitor 228. A logic high control signal, e.g., cl for the sample and hold circuit 261 associated with the first column, is also provided to the sample and hold circuit 261 being readout to close switch 218 and switch 216, thereby coupling the backside of capacitor 226 to the first input of amplifier 275 and coupling the backside of capacitor 228 to the second input of amplifier 275.

After the reset and integrated charge signals have been readout to amplifier 275, a logic low control signal Φamp is provided to the feedback circuits to open switch 279 and uncouple the first output of amplifier 275 from capacitor 278 and to open switch 277 and uncouple the second output of amplifier 275 from capacitor 276. A logic low crowbar control signal is provided to the sample and hold 261 being readout to open the associated crowbar switch 239, thereby uncoupling the front side of capacitor 226 from the front side of capacitor 228 (e.g., crowbar 1 for the first column). A logic low control signal e.g., cl, is also provided to the sample and hold 261 being readout to open switch 218 and switch 216, thereby uncoupling the backside of capacitor 226 from the first input of amplifier 275 and uncoupling the backside of capacitor 228 from the second input of amplifier 275. Thus, a correlated double sampled signal is provided as output from amplifier 275 resulting from the input of the integrated charge and reset signals to the amplifier 275.

After a row of sample and hold circuits 261 have been readout, a next of row of pixels 150 in the pixel array 230 are sample and held, and then readout through the amplifier 275.

The correlated double sampled signal output by an amplifier 275 can be expressed by:

$$V_{CDS} = V_{op} - V_{on} \quad (1)$$

$$= \left( \frac{C_{amp}}{C_{pr}} V_{pixel\_reset} - \frac{C_{amp}}{C_{nr}} V_{noise\_reset} \right) -$$

$$\left( \frac{C_{amp}}{C_{ps}} V_{pixel\_signal} - \frac{C_{amp}}{C_{ns}} V_{noise\_signal} \right)$$

where $C_{amp}$ is the feedback capacitance of the gain stage 276, 278 of amplifier 275, $C_{pr}$ is pixel_reset level sample-and-hold capacitor 226, and $C_{ps}$ is pixel_signal level sample-and-hold capacitor 228.

The pixel output level can be divided by terms, one for pure pixel level and the other for noise level at the sample phase:

$$V_{pixel\_reset} = V_{pixel\_reset\_without\_noise} + V_{noise\_reset} \quad (2)$$

and $$V_{pixel\_signal} = V_{pixel\_signal\_without\_noise} + V_{noise\_signal} \quad (3)$$

where Vpixel_reset_without_noise and Vpixel_signal_without_noise are the pixel_reset and the pixel_signal levels without noise, respectively, and Vnoise_reset and Vnoise_signal levels are the noise levels during the SHR phase and SHS phase, respectively.

By utilizing equations (2) and (3), and assuming $C_{amp}=Cf$ and also assuming that $C_s=C_{ps}=C_{pr}$, the correlated double sampled signal that is output can be expressed by:

$$V_{CDS} = \frac{C_f}{C_s} ((V_{pixel\_reset\_without\_noise} - V_{pixel\_signal\_without\_noise}) + \quad (4)$$

$$(V_{noise\_reset} - V_{noise\_signal}))$$

If the noise levels of the readout from the sample and hold circuit 261 at both falling edges of SHR and SHS are same, then the correlated double sampled signal output from amplifier 275 is provided without significant row noise. As seen for example, in FIG. 6, the noise in the circuit is at the same level throughout SHR and SHS; thus, the correlated double sampled signal output from amplifier 275 of the column output is provided without significant row noise. Thus, the signal on the column output is substantially 0 v after the correlated double sampled signal is output. Thus, there is no residual noise on the column circuit that affects subsequent columns being readout.

However, if the noise levels of the readout from the sample and hold circuit 261 at both falling edges of SHR and SHS are not same, then the correlated double sampled signal output from amplifier 275 has some significant row noise, as represented by a spike on the noise line in FIG. 7. As seen for example, in FIG. 7, the noise in circuit 261 is not at the same level throughout the SHR and SHS active periods, thus, the correlated double sampled signal output from amplifier 275 is provided with row noise. Thus, the signal on the column output is greater than 0 v and likely equal to the noise level after the correlated double sampled signal is output. This is depicted on the bottom line of FIG. 7, where the residual noise remains in the column circuit after the correlated double sampled signal is output. This residual noise on the column circuit affects subsequent rows being readout.

Thus, it is desirable to have a readout of signals from a pixel array with reduced row-wise temporal noise.

DETAILED DESCRIPTION OF THE INVENTION

In the following detailed description, reference is made to the accompanying drawings, which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made.

Embodiments described herein provide a sample and hold circuit that reduces the effect of row-wise noise. By providing additional storage circuits in the sample and hold circuit to sample a reference voltage during an integrated charge signal readout and during a reset readout and using these reference signals during the sample and hold readout, noise can be offset.

Figure 1:
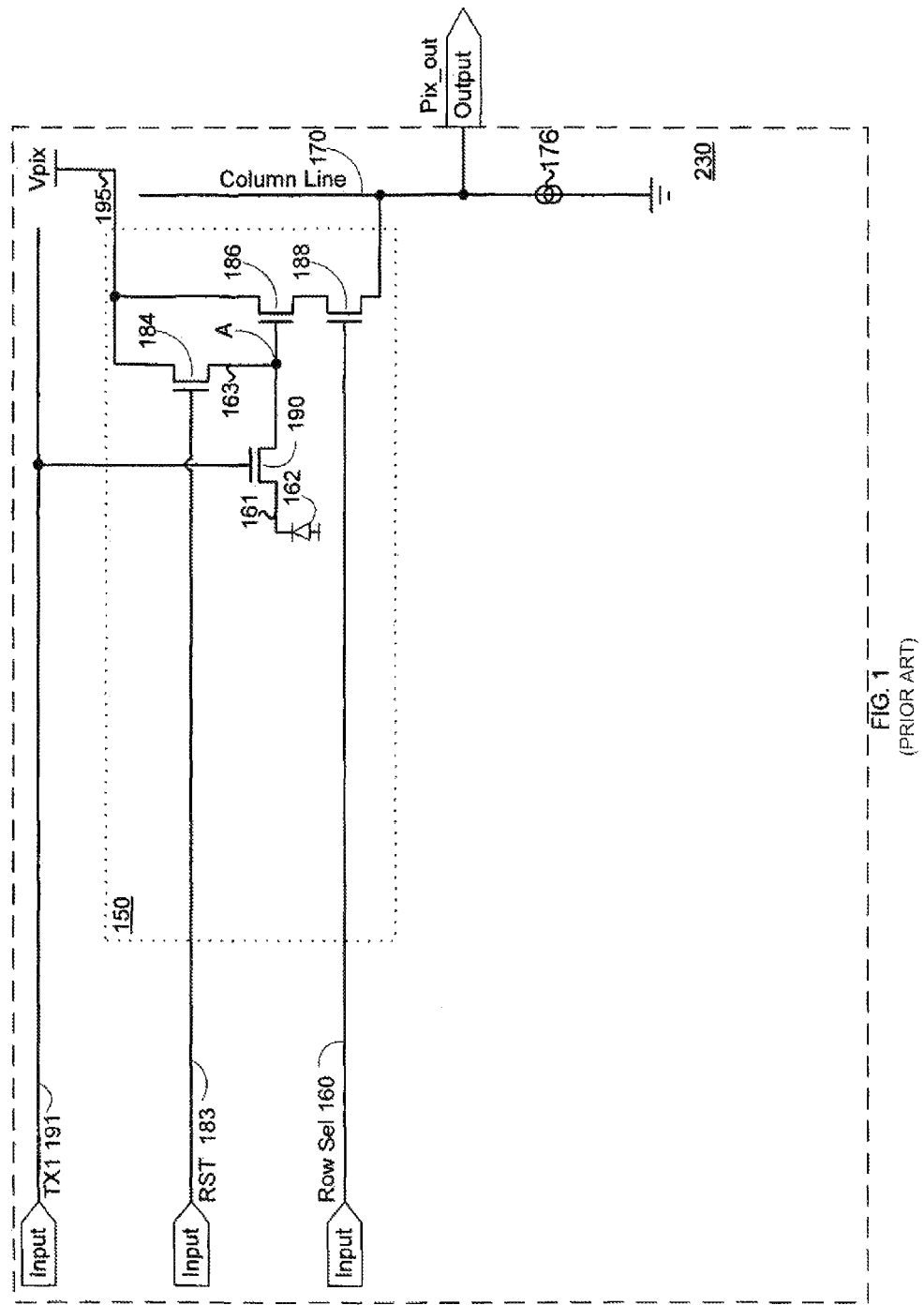
FIG. 1 is a schematic diagram of a conventional imager pixel.
Figure 2:
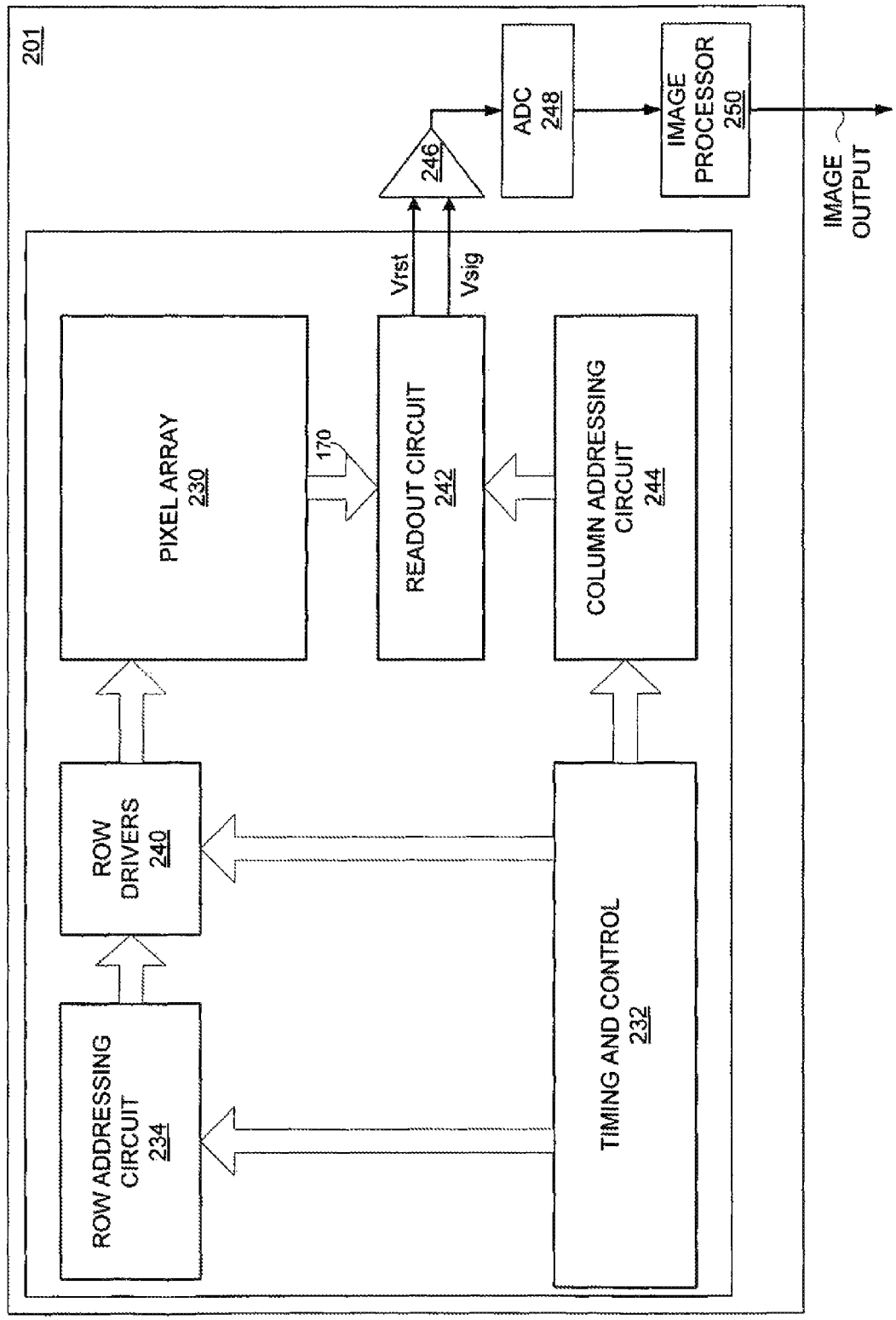
FIG. 2 is a block diagram of a conventional imager chip.
Figure 3:
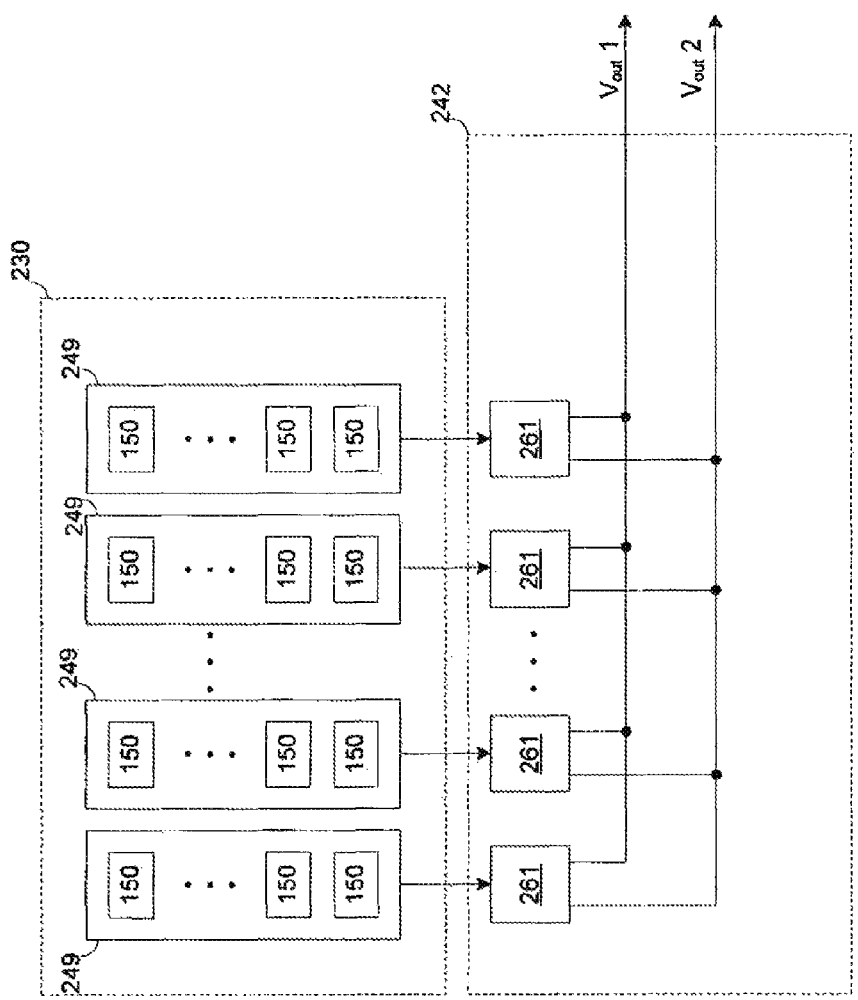
FIG. 3 is a block diagram of a portion of an array of pixels illustrated in FIG. 2 and an associated column readout circuit.
Figure 4:
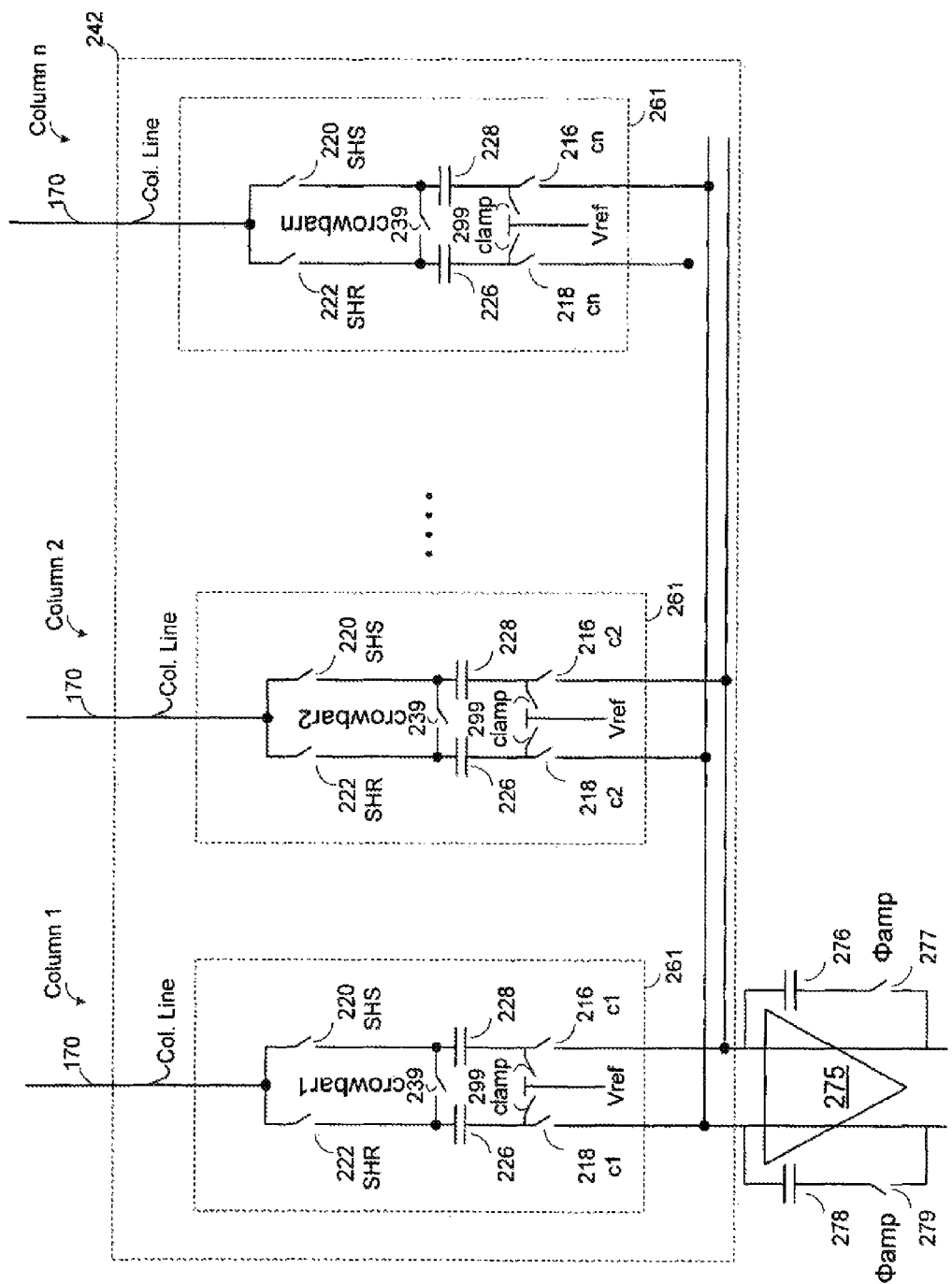
FIG. 4 is a conventional-sample and hold circuit.
Figure 5:
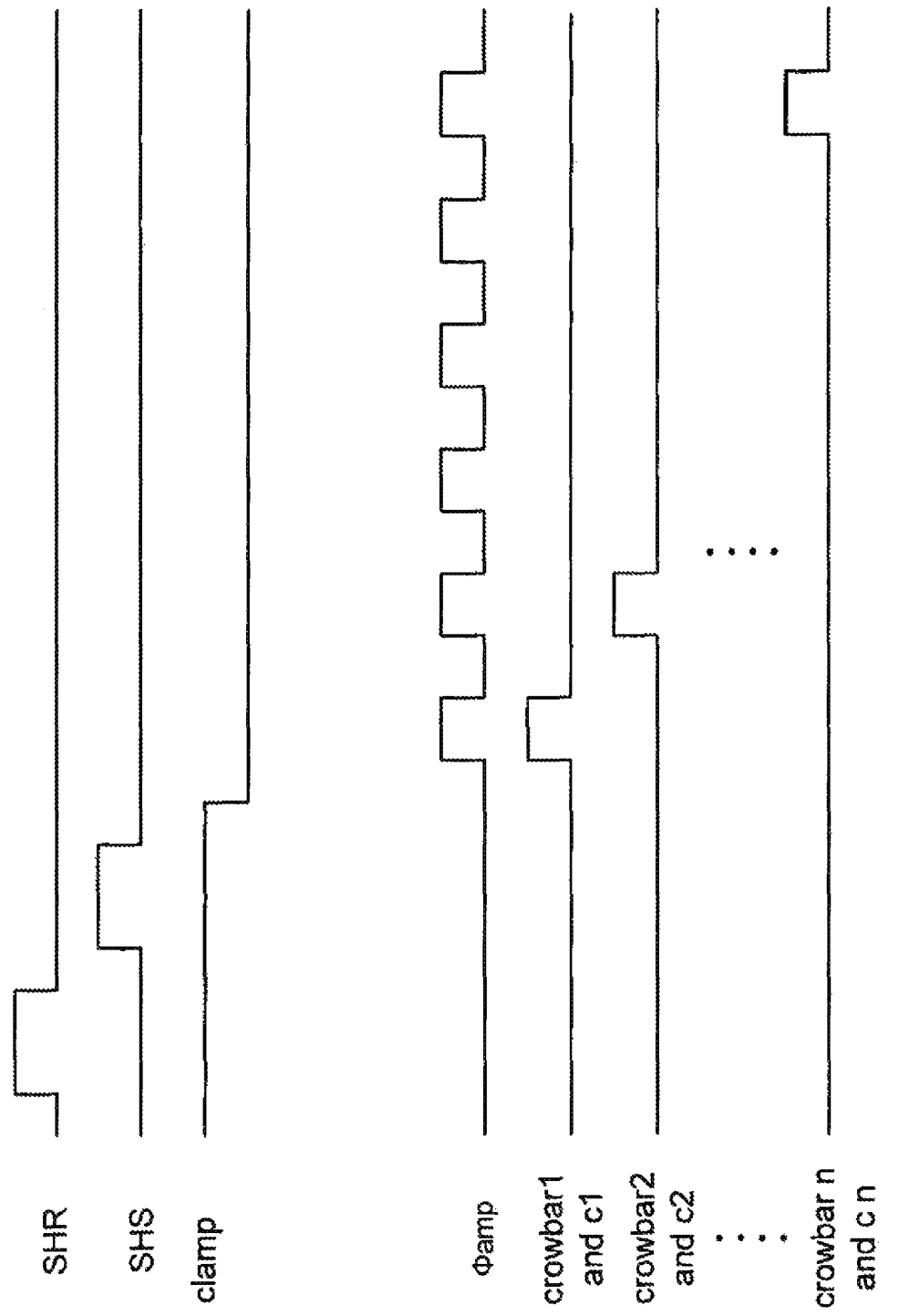
FIG. 5 is a simplified timing diagram associated with operation of the circuitry of FIGS. 1-4.
Figure 6:
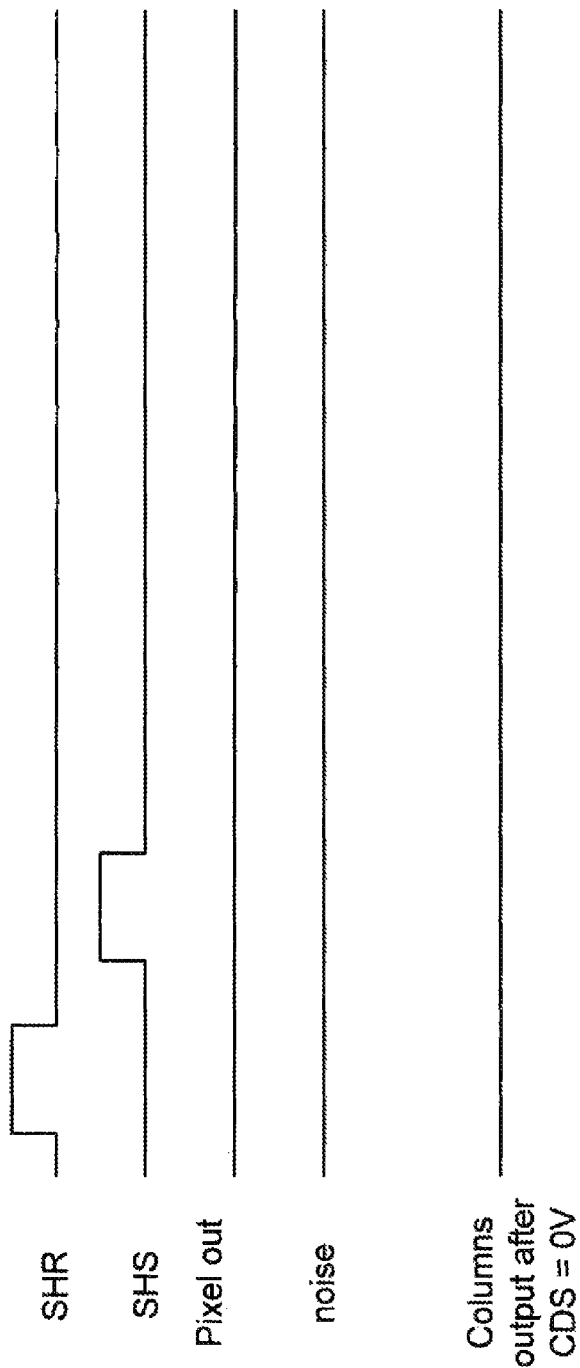
FIG. 6 is a simplified timing diagram associated with operation of the circuitry of FIGS. 1-4 showing the lack impact of the lack noise on the column circuit.
Figure 7:
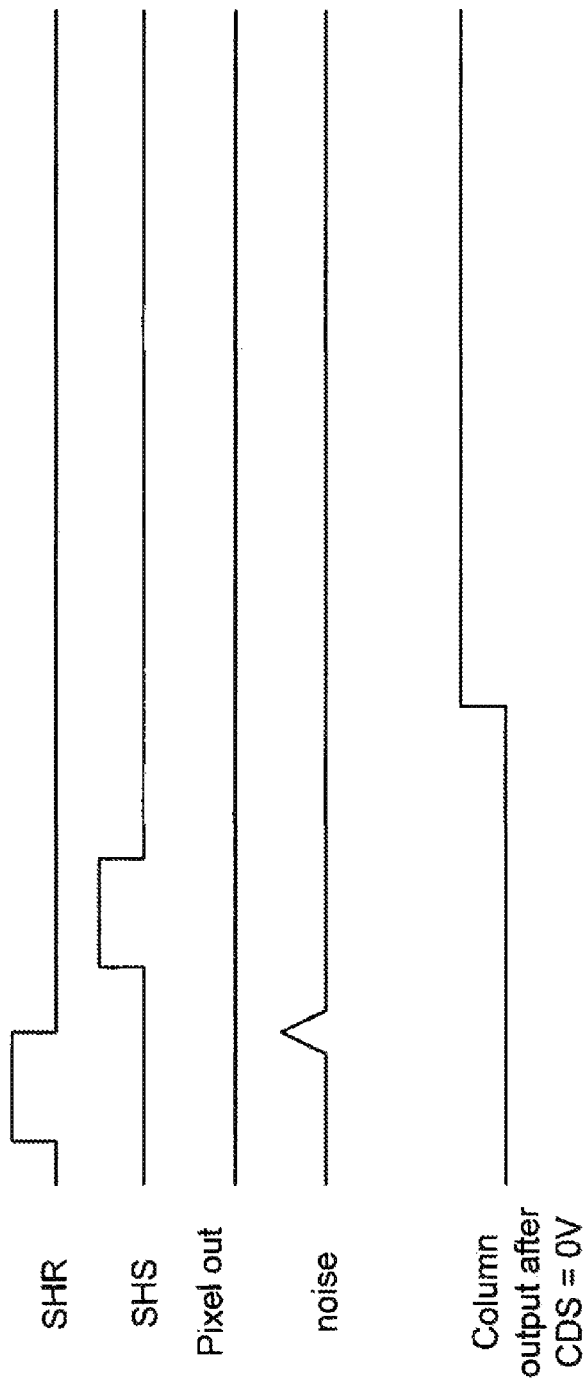
FIG. 7 is a simplified timing diagram associated with operation of the circuitry of FIGS. 1-4 showing an impact of noise on the column circuit.
Figure 8:
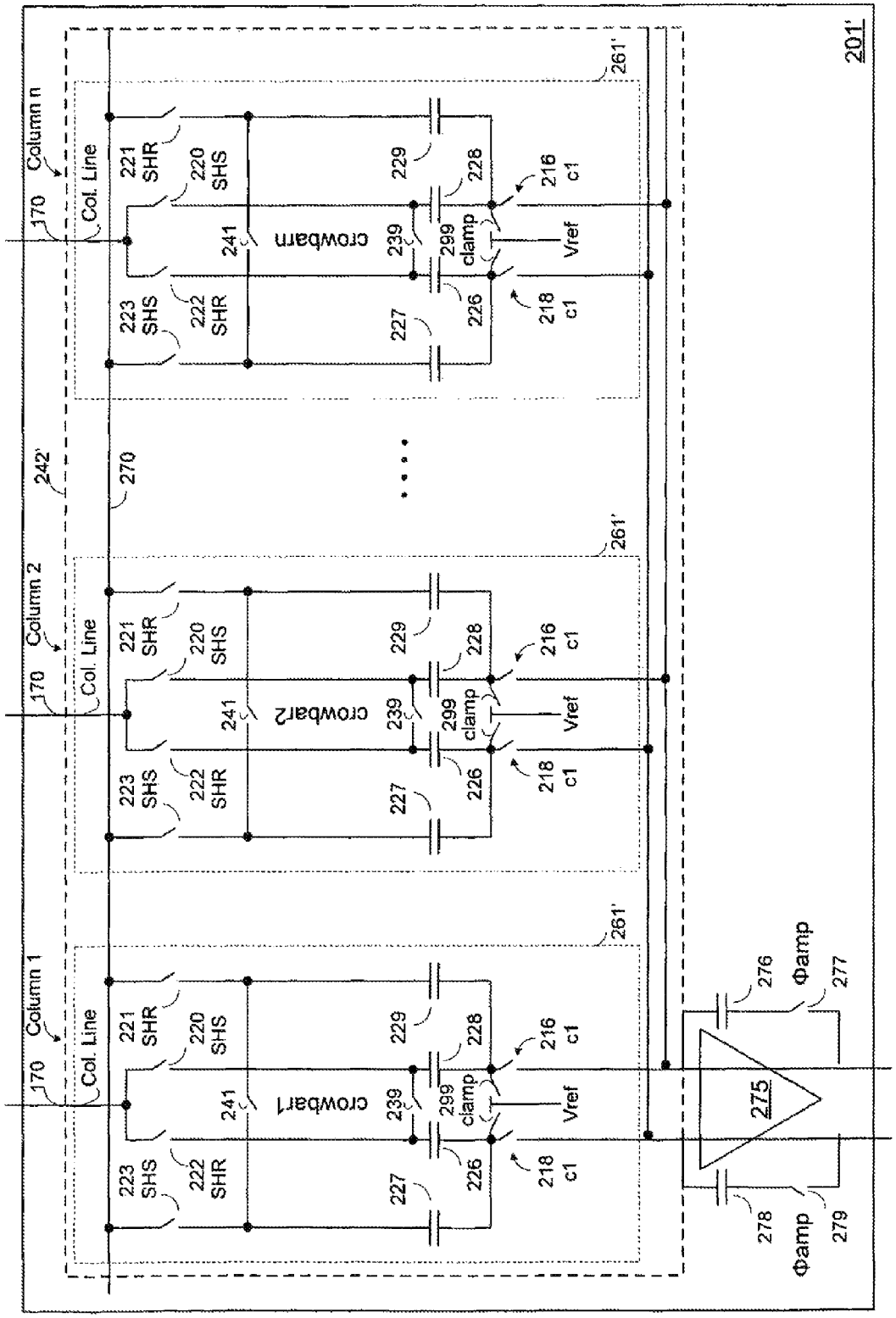
FIG. 8 is a schematic diagram of a sample and hold circuit of an imager in accordance with an example embodiment described herein.

FIG. 8 is a schematic diagram of a readout circuit 242' of an imager in accordance with an example embodiment. The CMOS imager integrated chip 201' is similar to CMOS imager 201 (FIG. 2) and includes readout circuit 242' instead of circuit 242. The sample and hold circuit 261' of FIG. 8 is similar to the conventional sample and hold circuit 261; but also includes an additional pair of storage regions and a reference voltage source. Although the readout circuit 242' is depicted as comprising three sample and hold circuits 261', the embodiment is not so limited; any number of sample and hold circuits 261' can be used as needed and dependant upon the architecture of the associated pixel array.

The sample and hold circuit 261' holds a set of signals, e.g., a reset signal Vrst and an integrated charge signal Vsig from a desired pixel. For example, a reset signal Vrst of a desired pixel connected to column line 170 is stored on capacitor 226 and the integrated charge signal Vsig is stored on capacitor 228. A front side of capacitor 226 is switchably coupled to the column line 170 through switch 222 and a backside of capacitor 226 is switchably coupled to amplifier 275 through switch 218. A front side of capacitor 228 is switchably coupled to the column line 170 through switch 220 and a backside of capacitor 228 is switchably coupled to amplifier 275 through switch 216. The front side of capacitor 226 is switchably coupled to the front side of capacitor 228 through crowbar switch 239. The backside of capacitor 226 is switchably coupled to the backside of capacitor 228 and to a reference voltage Vref source through clamp switch 299. A front side of capacitor 227 is switchably coupled to a noise reference line 270 through switch 223 and a backside of capacitor 227 is coupled to the backside of capacitor 226. A front side of capacitor 229 is switchably coupled to the noise reference line 270 through switch 221 and a backside of capacitor 229 is coupled to the backside of capacitor 228. The front side of capacitor 227 is switchably coupled to the front side of capacitor 229 through crowbar switch 241.

Each sample and hold circuit 261' is coupled to amplifier 275 having a first and a second input. The first input of amplifier 275 is coupled to a first output of amplifier 275 through a capacitor 278 and a switch 279 to provide a first feedback circuit. The second input of amplifier 275 is coupled to a second output of amplifier 275 through a capacitor 276 and a switch 277 to provide a second feedback circuit.

As depicted in FIG. 8, two capacitors 227, 229 are added to sample the noise level when SHR (sample-and-hold-reset) and SHS (sample-and-hold-signal) are asserted high. During an SHR phase, the Vrst level is stored in capacitor 226 having a capacitance $C_{pr}$ and a noise level is stored in capacitor 229 having capacitor $C_{nr}$. During an SHS phase the Vsig level is stored in capacitor 228 having capacitor $C_{ps}$ and noise level is stored in capacitor 227 having capacitor $C_{ns}$. Then the transfer function of the gain stage is:

$$V_{CDS} = V_{op} - V_{on} \quad (5)$$

$$= \left(\frac{C_{amp}}{C_{pr}} V_{pixel\_reset} - \frac{C_{amp}}{C_{nr}} V_{noise\_reset}\right) - \left(\frac{C_{amp}}{C_{ps}} V_{pixel\_signal} - \frac{C_{amp}}{C_{ns}} V_{noise\_signal}\right),$$

where $C_{amp}$ is feedback capacitance of the gain stage based on capacitors 278, 276, and $C_{pr}$, $C_{ps}$, $C_{nr}$, and $C_{ns}$ are the capacitances associated with the capacitors, to store Vpixel_reset level (i.e., Vrst), Vpixel_signal level (i.e., Vsig), noise level during the SHR phase (Vnoise_reset) and noise level during the SHS phase (Vnoise_signal), respectively.

Assuming $C_s = C_{pr} = C_{ps} = C_{nr} = C_{ns}$ and $C_f = C_{amp}$, equation (6) becomes:

$$V_{CDS} = \frac{C_f}{C_s}((V_{pixel\_reset} - V_{noise\_reset}) - V_{pixel\_signal} - V_{noise\_signal}) \quad (6)$$

Since the sampled pixel output level includes the noise at the moment of the sampling phase, the sampled pixel output level can be expressed by:

$$V_{pixel\_reset} = V_{pixel\_reset\_without\_noise} + V_{noise\_reset} \quad (7)$$

and $$V_{pixel\_signal} = V_{pixel\_signal\_without\_noise} + V_{noise\_signal} \quad (8)$$

By inserting equations (7) and (8) into equation (6), equation (6) becomes:

$$V_{CDS} = \frac{C_f}{C_s}((V_{pixel\_reset\_without\_noise} - V_{pixel\_signal\_without\_noise})) \quad (9)$$

Therefore, the correlated double sampled signal $V_{CDS}$ is determined by the pixel output level with noise being reduced, which leads to row-wise temporal noise being substantially reduced noise.

Figure 9:
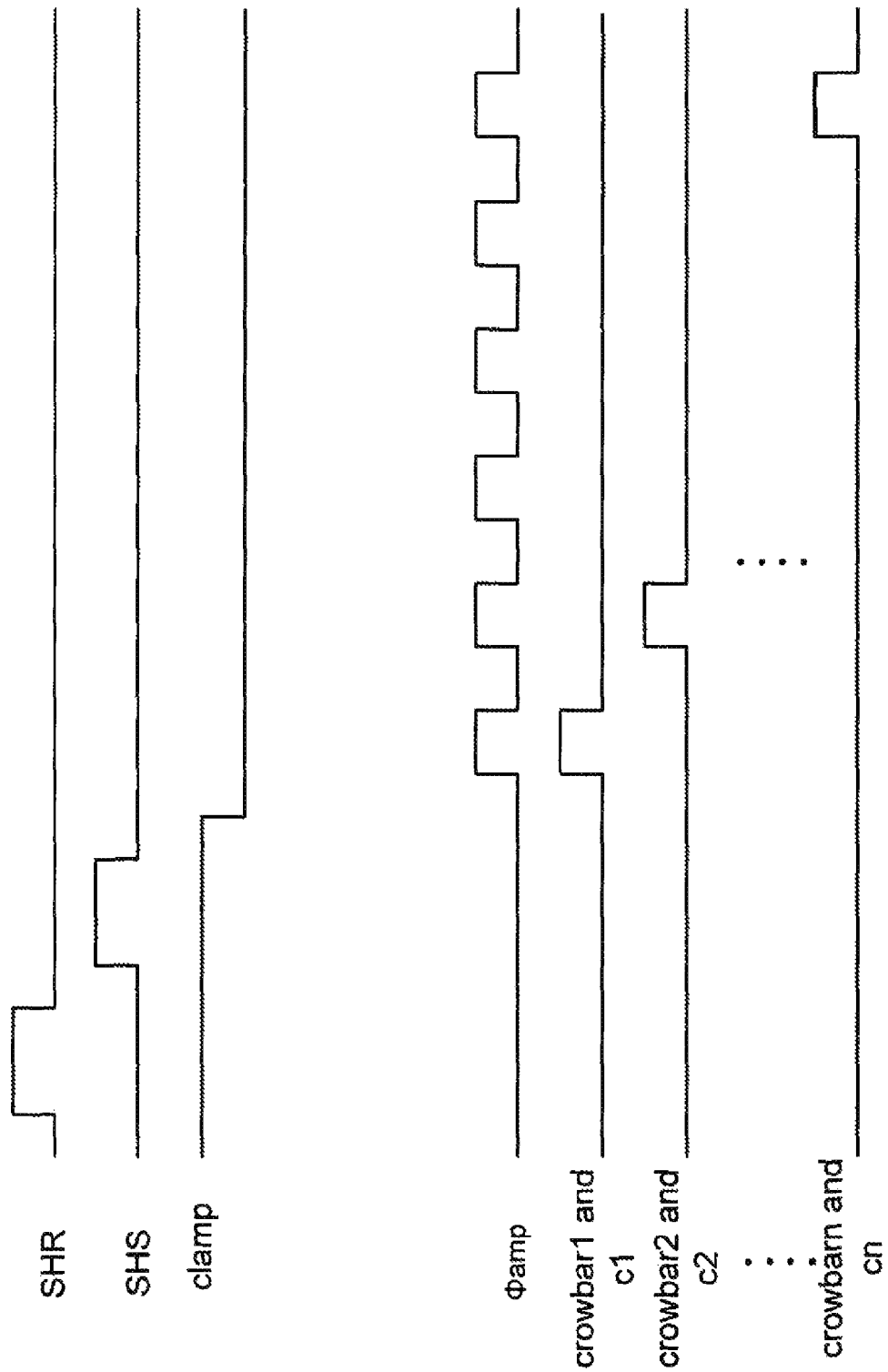
FIG. 9 is a simplified timing diagram associated with operation of the circuitry of FIG. 8.

FIG. 9 shows the correlated double sampling timing of the circuit of FIG. 8. The timing is similar to the timing for prior art.

To begin a readout operation, a logic high clamp signal is provided to clamp switch 299 thereby coupling the backsides of capacitors 226, 227, 228, 229 to the reference voltage source Vref. When a reset signal Vrst is read from a pixel 150, a logic high SHR signal is provided to the gate of switch 222, coupling the front side of capacitor 226 to the column line 170. At substantially the same time, the logic high SHR signal is provided to the gate of switch 221, coupling the front side of capacitor 229 to the noise reference line 270.

When the readout of the reset signal Vrst from the pixel 150 is complete, a logic low SHR signal is provided to the gate of switch 222 thereby uncoupling the front side of capacitor 226 from the column line 170. The logic low SHR signal is also provided to the gate of switch 221, uncoupling the front side of capacitor 229 from the noise reference line 270. Thus, a reset signal Vrst has been sampled and stored on capacitor 226. Additionally, a noise reference reset signal (Vnoise_reset) has been sampled and stored on capacitor 229.

After the reset signal Vrst is read from pixel 150, an integrated charge signal Vsig is read from pixel 150. When the integrated charge signal Vsig is read from pixel 150, a logic high SHS signal is provided to the gate of switch 220, coupling the front side of capacitor 228 to the column line 170. At substantially the same time, the logic high SHS signal is provided to the gate of switch 223, coupling the front side of capacitor 227 to the noise reference line 270.

When the readout of the integrated charge signal Vsig is complete, a logic low SHS signal is provided to the gate of switch 220, uncoupling the front side of capacitor 228 from the column line 170. The logic low SHS signal is provided to the gate of switch 223, uncoupling the front side of capacitor 227 from the noise reference line 270. Thus, an integrated charge signal Vsig has been sampled and stored on capacitor 228. Additionally, a noise reference integrated charge signal (Vnoise_signal) has been sampled and stored on capacitor 227.

When a readout operation is complete, a logic low clamp signal is provided to clamp switch 299 thereby uncoupling the backsides of capacitors 226, 227, 228, 229 from the reference voltage source Vref.

After a row of pixels has been readout and sampled and held, then, generally in column order, the sample and hold circuits output their stored signals to the amplifier 275. When reading from a first sample and hold circuit 261', a logic high control signal Φamp is provided to the feedback circuits to close switch 279 to couple the first output of amplifier 275 through capacitor 278 to its first input and to close switch 277 to couple the second output of amplifier 275 through capacitor 276 to its second input. A logic high crowbar control signal, e.g., crowbar1 for the sample and hold circuit 261' associated with the first column, is also provided to the sample and hold circuit 261' being readout to close the associated crowbar switch 239, thereby coupling the front side of capacitor 226 to the front side of 228.

The logic high crowbar control signal, e.g., crowbar1 for the sample and hold circuit 261' associated with the first column, is also provided to close the associated crowbar switch 241, thereby coupling the front side of capacitor 227 to the front side of 229.

A logic high "c" control signal, e.g., cl for the sample and hold circuit 261' associated with the first column, is also provided to the sample and hold 261' being readout to close switch 218 and switch 216, thereby coupling the backside of capacitor 226 and capacitor 227 to the first input of amplifier 275 and coupling the backside of capacitor 228 and 229 to the second input of amplifier 275.

After the reset and integrated charge signals and the reset and integrated noise reference signals have been readout to amplifier 275, a logic low control signal Φamp is provided to the feedback circuits to open switch 279 and uncouple the first output of amplifier 275 from capacitor 278 and to open switch 277 and uncouple the second output of amplifier 275 from capacitor 276. A logic low crowbar control signal is provided to the sample and hold 261' being readout to open the associated crowbar switch 239, thereby uncoupling the front side of capacitor 226 from the front side of capacitor 228. The logic low crowbar control signal is also provided to open the associated crowbar switch 241, thereby uncoupling the front side of capacitor 227 from the front side of 229.

A logic low control signal, e.g., cl, is also provided to the sample and hold 261' being readout to open switch 218 and switch 216, thereby uncoupling the backside of capacitor 226 and 227 from the first input of amplifier 275 and uncoupling the backside of capacitor 228 and capacitor 229 from the second input of amplifier 275. A correlated double sampled signal is provided as output from amplifier 275 resulting from the input of the integrated charge and reset signals and the reset and integrated noise reference signals to the amplifier 275.

After a row of sample and hold circuits 261' have been readout, a next of row of pixels 150 in the pixel array 230 are sample and held, and readout through the amplifier 275.

Figure 10:
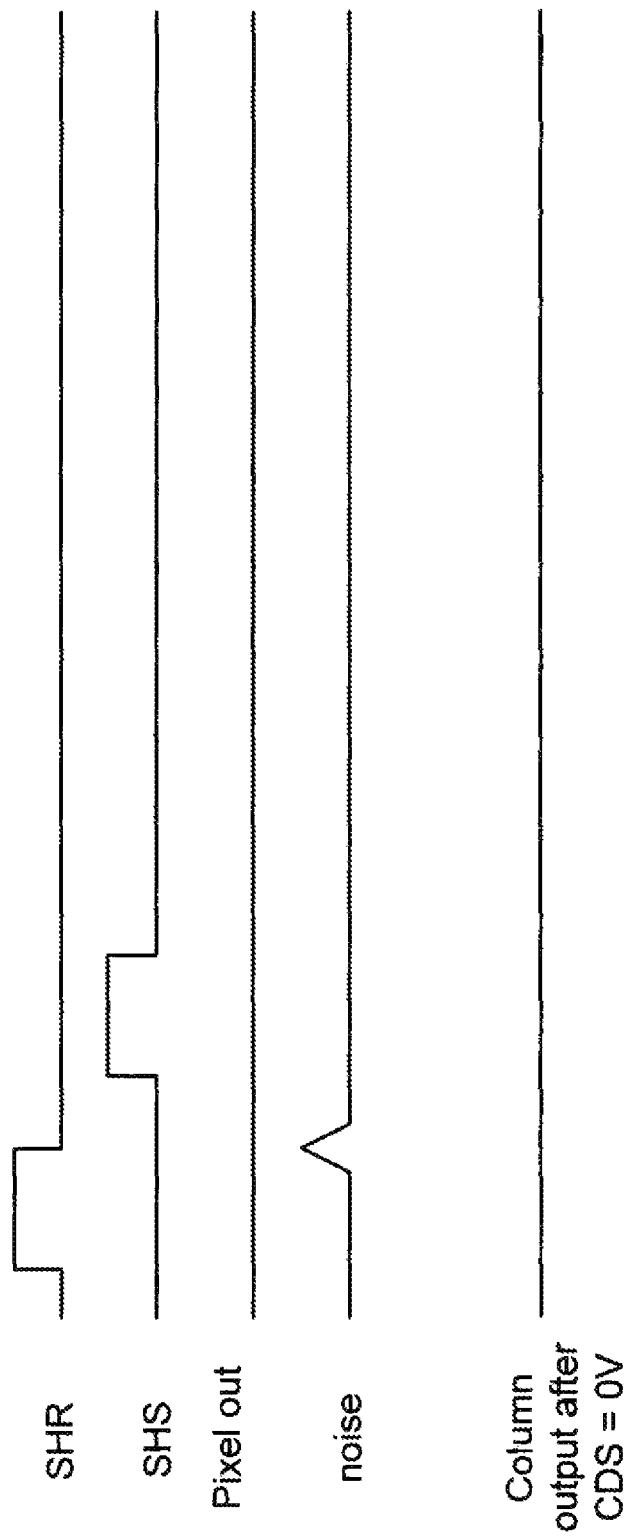
FIG. 10 is a simplified timing diagram associated with operation of the circuitry of FIG. 8 showing an impact of noise on the column circuit.

As seen for example, in FIG. 10, the noise in readout circuit 261' is not at the same level throughout SHR and SHS, as represented by a spike on the noise line. The correlated double sampled signal is output from amplifier 275 is provided with substantially no row noise using the noise reference circuits 227. 229 described above. Thus, the signal on the column output after the noise spike, remains substantially equal to 0 v. Thus, there is substantially no residual noise on the column circuit that affects subsequent columns being readout.

Figure 11A:
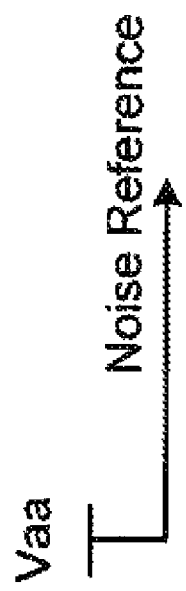
FIGS. 11a-11f depicts various example reference noise circuits used in embodiments disclosed herein.
Figure 11B:
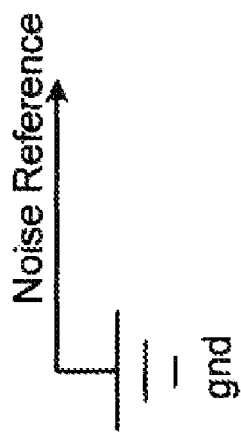

A noise reference for the noise reference line 270 (FIG. 8) can be generated from either an array voltage Vaa, a ground potential, dark column, dark row, or any appropriate voltage source. FIGS. 11a-11f depicts various possible circuits that can be used as a noise source for the noise reference line 270. FIG. 11a depicts using the array or rail voltage Vaa as the voltage source for the noise reference line 270. FIG. 11b depicts using a ground potential gnd as the voltage source for the noise reference line 270.

Figure 11C:
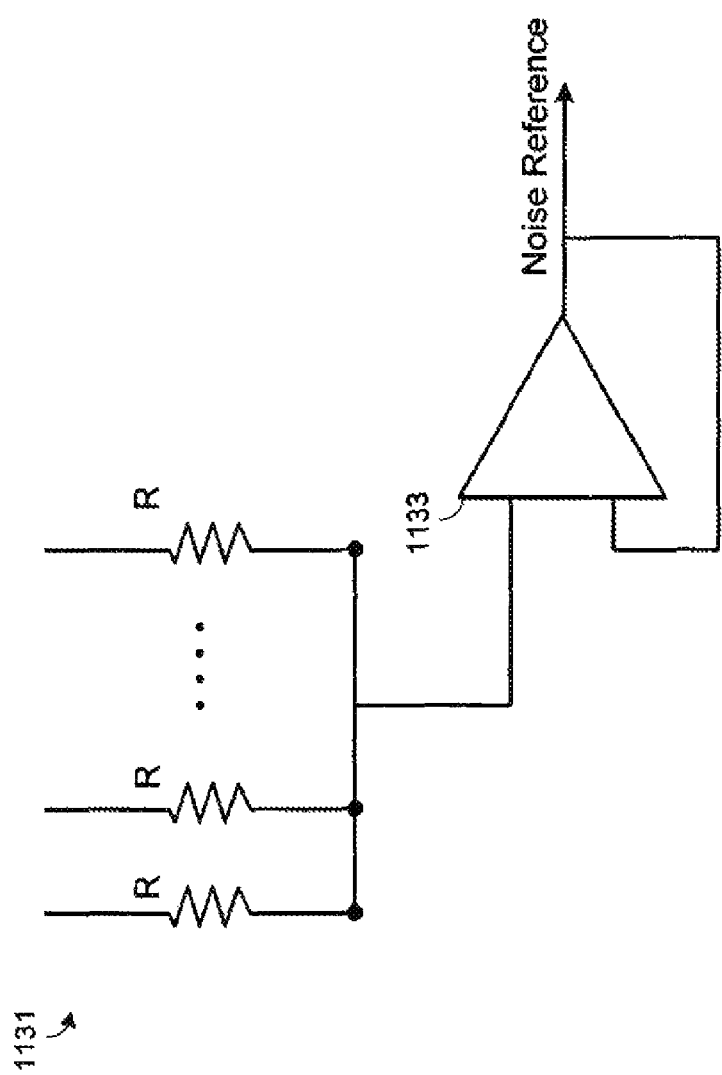

FIG. 11c depicts using a plurality of resistors 1131 having resistance R and buffer 1133 as the voltage source for the noise reference line 270. Although not shown, the top ends of the resistors 1131 are coupled to a predictable voltage source, for example, Vaa. When resistors 1131 are used to average dark column noise signals, the noise reference level can be expressed by:

$$V_{noisereference} = \frac{1}{n}\frac{1}{R}(\Delta V_{d1} + \Delta V_{d2} + \ldots + \Delta V_{dn}) \quad (10)$$

where $\Delta V_{d1}$=V (t=falling edge of SHR)–V (t=rising edge of SHR) during SHR and $\Delta V_{d1}$=V (t=falling edge of SHS)–V (t=rising edge of SHS) during SHS.

Figure 11D:
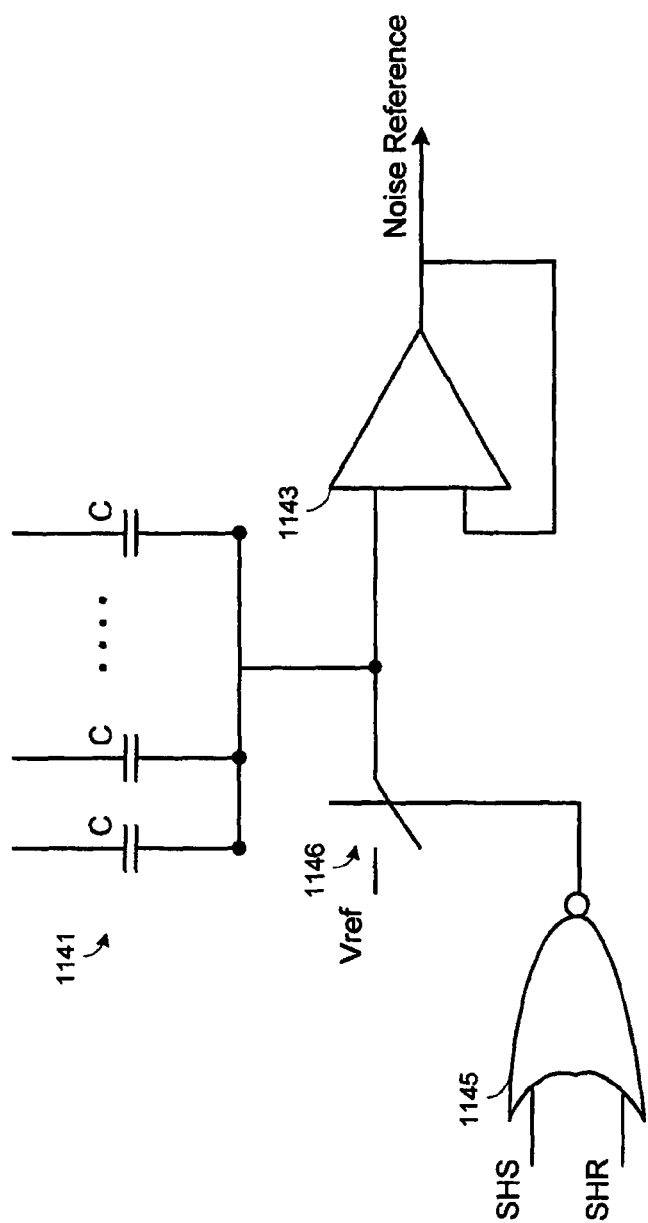

FIG. 11d depicts using a plurality of capacitors 1141 having capacitance C and a buffer 1143 as the voltage source for the noise reference line 270. If capacitors 141 are used, the noise reference level can be expressed by:

$$V_{noisereference} = \frac{1}{n}C(\Delta V_{d1} + \Delta V_{d2} + \ldots + \Delta V_{dn}) + V_{ref}$$

where $\Delta V_{d1}$=V (t=falling edge of SHR)–V (t=rising edge of SHR) during SHR and $\Delta V_{d1}$=V (t=falling edge of SHS)–V (t=rising edge of SHS) during SHS. NOR circuit 1145 provides a signal to close switch 1146 thereby coupling Vref to capacitors 1141 and buffer 1143 when either SHS or SHR provides a logic high signal. Although not shown, the top ends of the capacitors 1141 are coupled to a predictable voltage source, for example, Vaa.

Figure 11E:
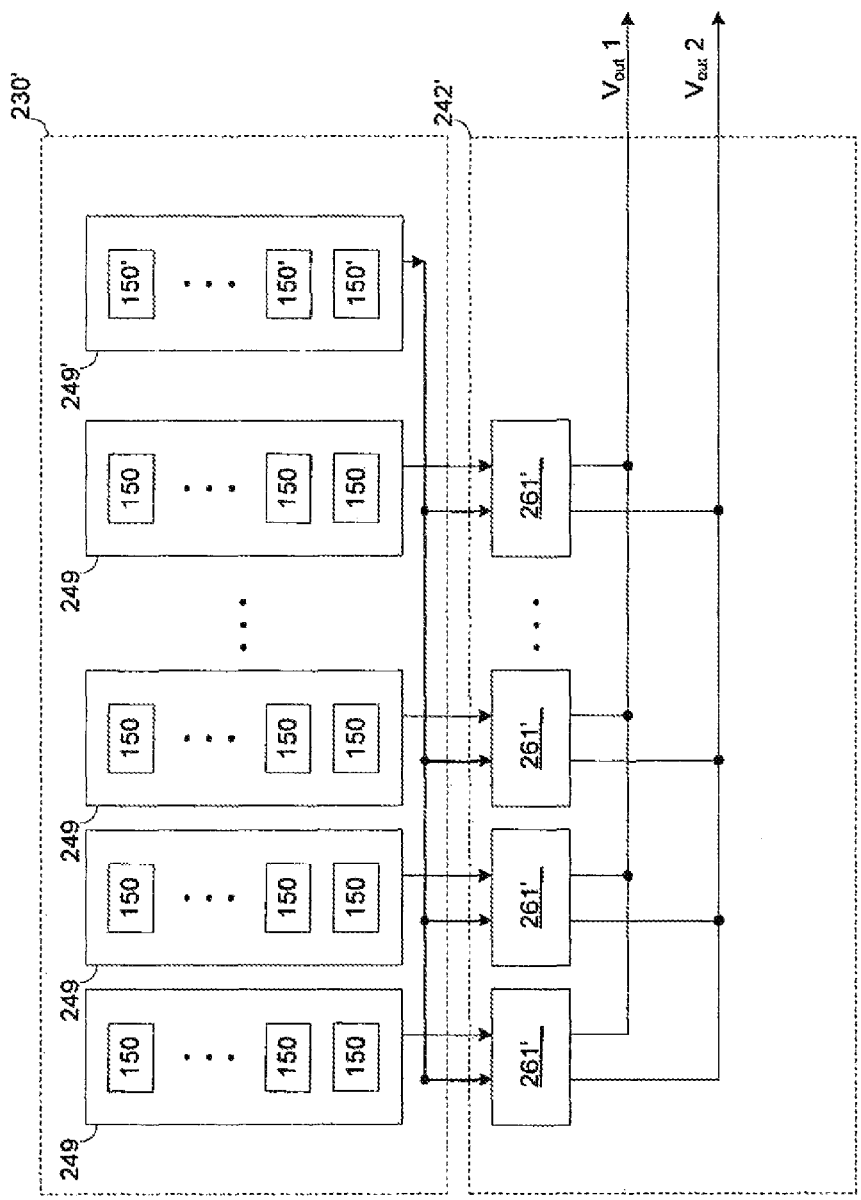

FIG. 11e depicts using a column 249' of dark pixels 150' as the voltage source for the noise reference line 270. A dark pixel 150' is a pixel, a light shielded pixel, or a pixel not having a photo conversion region, that is configured to not provide a charge accumulation signal based on light impinging on the pixel.

Figure 11F:
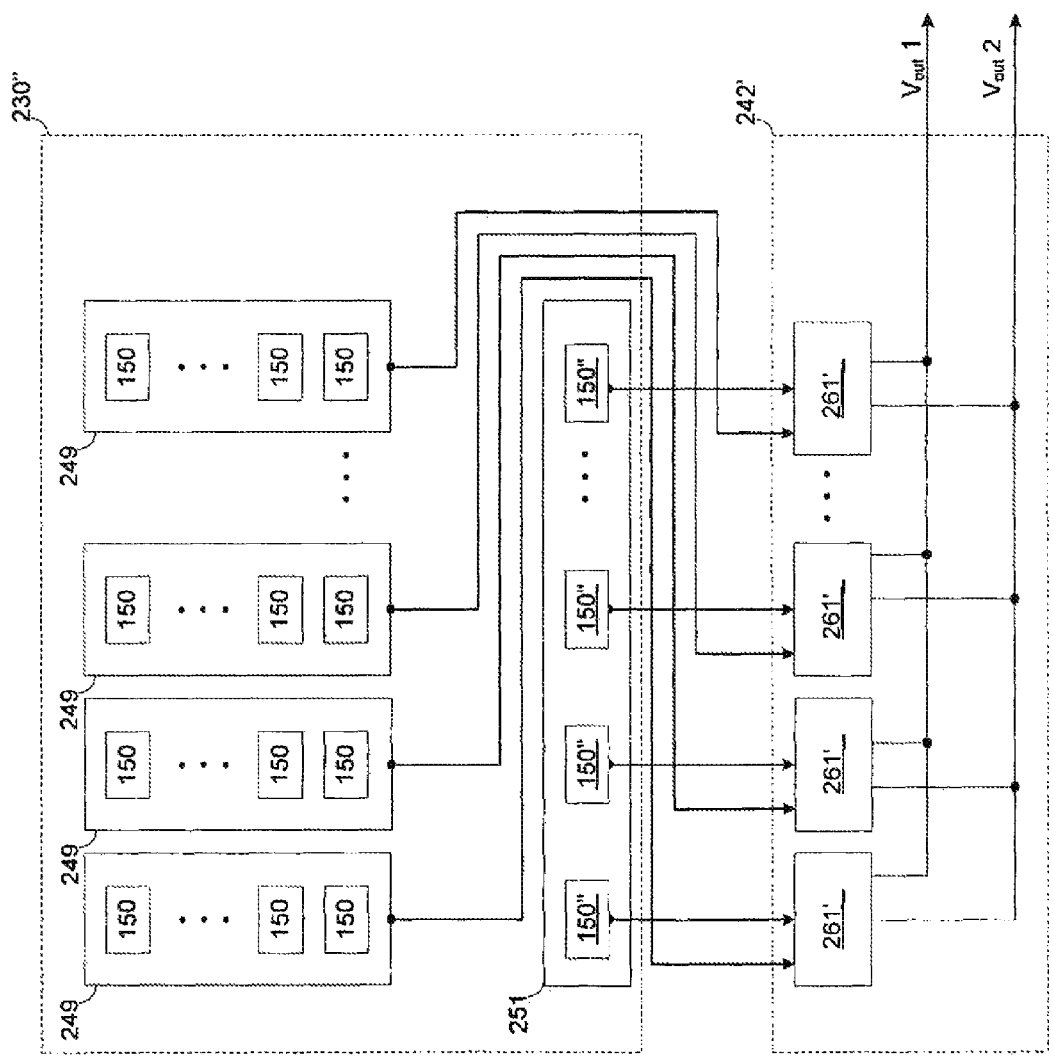

FIG. 11f depicts using a row 251 of dark pixels 150" as the voltage source for the noise reference line 270. A dark pixel 150" is a pixel, a light shielded pixel, or a pixel not having a photo conversion region, that is configured to not provide a charge accumulation signal based on light impinging on the pixel.

Figure 12:
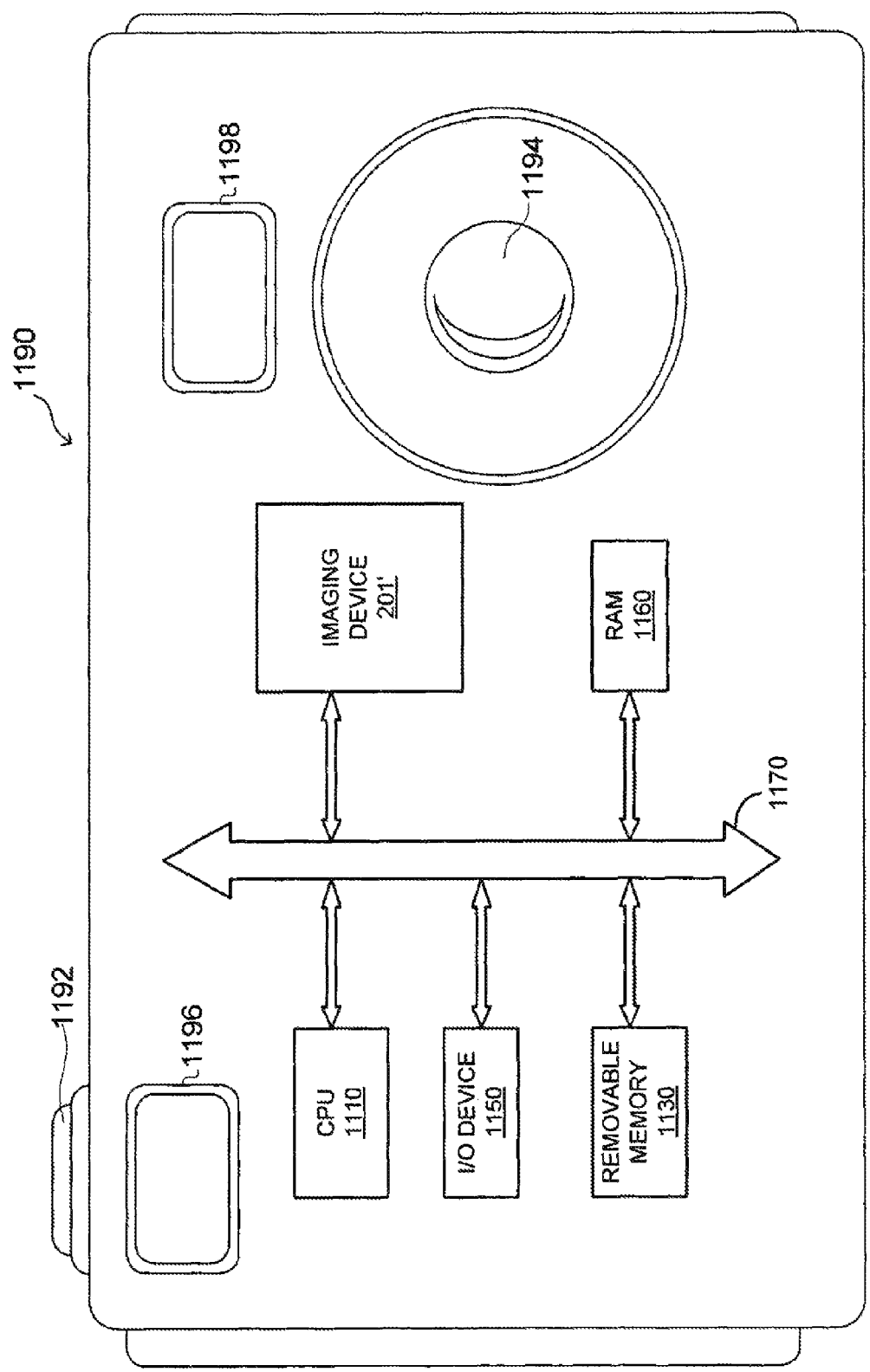
FIG. 12 is a block diagram representation of a processor-based camera system incorporating a CMOS imaging device in accordance with an embodiment of the invention.

FIG. 12 is a block diagram representation of processor system that may include the imaging device 201' and associated readout circuitry as described with respect to the various embodiments described herein. The processor system could, for example be a camera system 1190, incorporate an imaging device 201' in accordance with an embodiment described above. A camera system 1190 generally comprises a shutter release button 1192, a view finder 1196, a flash 1198 and a lens system 1194 for focusing an image on the pixel array of imaging device 201'. A camera system 1190 generally also comprises a central processing unit (CPU) 1110, for example, a microprocessor for controlling camera functions which communicates with one or more input/output devices (I/O) 1150 over a bus 1170. The CPU 1110 also exchanges data with random access memory (RAM) 1160 over bus 1170, typically through a memory controller. The camera system may also include peripheral devices such as a removable memory 1130, which also communicates with CPU 1110 over the bus 1170. Imager device 201' is coupled to the processor system and includes a pixel imaging circuit as described along with respect to FIGS. 8-11f. Other processor systems which may employ imaging devices 201' besides cameras, including computers, PDAs, cellular telephones, scanners, machine vision systems, and other systems requiring an imager operation.

While the embodiments have been described and illustrated with reference to specific example embodiments, it should be understood that many modifications and substitutions can be made. Although the embodiments discussed above describe specific numbers of transistors, photodiodes, conductive lines, etc., they are not so limited. Accordingly, the claimed invention is not to be considered as limited by the foregoing description but is only limited by the scope of the claims.

What is claimed as new and desired to be protected by Letters Patent of the United States is:

1. A readout circuit for a pixel array, comprising:
a sample and hold circuit comprising:
a noise reference storage area switchably coupled to a noise reference source for storing a noise reference; and
a pixel storage area for storing pixel signals from a column of the array; and
first and second storage areas in the pixel storage area for storing charge accumulation and reset signals from a pixel; and
a noise reference signal storage area comprising third and fourth storage areas for storing first and second noise reference signals from a noise reference source, wherein a first side of the third storage area is switchably coupled to a first side of the fourth storage area and the noise reference source, a second side of the third storage area is switchably coupled to a first input of the amplifier, and a second side of the fourth storage area is switchably coupled to a second input of the amplifier.

2. The readout circuit of claim 1, wherein a first side of the first storage area is switchably coupled to a first side of the second storage area, a second side of the first storage area is switchably coupled to the second input of the amplifier, and a second side of the second storage area is switchably coupled to the first input of the amplifier.

3. The readout circuit of claim 2, further comprising:
a reference voltage source switchably coupled to the second sides of the first, second, third, and fourth storage areas for providing a voltage reference to the first, second, third, and fourth storage areas.

4. The readout circuit of claim 1, wherein the noise reference voltage source further comprises a rail voltage noise reference voltage source.

5. The readout circuit of claim 1, wherein the noise reference voltage source further comprises a ground voltage noise reference voltage source.

6. The readout circuit of claim 1, wherein the noise reference voltage source further comprises a resistive voltage noise reference voltage source.

7. The readout circuit of claim 6, wherein the resistive voltage noise reference voltage source further comprises a plurality of resistive circuits coupled together in parallel.

8. The readout circuit of claim 1, wherein the noise reference voltage source further comprises a capacitive voltage noise reference voltage source.

9. The readout circuit of claim 8, wherein the capacitive voltage noise reference voltage source further comprises a plurality of capacitive circuits coupled together in parallel.

10. A method of operating a pixel array, comprising:
sampling and holding noise reference signals from a noise reference source;
sampling and holding pixel signals from a pixel; and
averaging both the sampled noise reference signals and pixel signals, wherein sampling and holding noise reference voltage signals further comprises sampling and holding first and second noise reference voltage signals in first and second storage areas, respectively and wherein sampling and holding pixel signals further comprises sampling and holding charge accumulation and reset signals from a pixel in third and fourth storage areas, respectively.

11. The method of claim 10, wherein the first noise reference voltage signal and the charge accumulation signal are sampled and stored at substantially the same time.

12. The method of claim 11, wherein the second noise reference voltage signal and the reset signal are sampled and stored at substantially the same time.

13. The method of claim 11, further comprising:
switchably coupling a reference voltage source to the first, second, third, and fourth storage areas for providing a voltage reference to the first, second, third, and fourth storage areas.

14. The method of claim 10, wherein the noise reference voltage source further comprises a rail voltage noise reference voltage source.

15. The method of claim 10, wherein the noise reference voltage source further comprises a ground voltage noise reference voltage source.

16. The method of claim 10, wherein the noise reference voltage source further comprises a resistive voltage noise reference voltage source.

17. The method of claim 10, wherein the resistive voltage noise reference voltage source further comprises a plurality of resistive circuits coupled together in parallel.

18. The method of claim 10, wherein the noise reference voltage source further comprises a capacitive voltage noise reference voltage source.

* * * * *